United States Patent [19]

Lau

[11] Patent Number: 5,319,767

[45] Date of Patent: Jun. 7, 1994

[54] SLAVE CONTROLLER FOR EFFECTING A BLOCK TRANSFER OF SIXTEEN BIT WORDS BETWEEN A MEMORY AND A DATA TRANSFER BUS

[75] Inventor: Nelson D. Lau, Camarillo, Calif.

[73] Assignee: The United States of America as represented by the Secretary of the Navy, Washington, D.C.

[21] Appl. No.: 937,624

[22] Filed: Aug. 25, 1992

Related U.S. Application Data

[63] Continuation-in-part of Ser. No. 907,759, Jun. 29, 1992.

[51] Int. Cl.$^5$ .................... G06F 12/02; G06F 12/06
[52] U.S. Cl. .................... 395/425; 395/400; 395/500
[58] Field of Search .................... 395/400, 425, 500

[56] References Cited

U.S. PATENT DOCUMENTS

| | | | |
|---|---|---|---|
| 4,620,277 | 10/1986 | Fisher et al. | 395/400 |
| 4,761,736 | 8/1988 | Di Ono | 395/425 |
| 4,761,768 | 8/1988 | Turner et al. | 365/201 |
| 4,766,569 | 8/1988 | Turner et al. | 365/185 |
| 4,918,650 | 4/1990 | De Wolf | 395/425 |
| 5,155,823 | 10/1992 | Tsue | 395/400 |
| 5,210,847 | 5/1993 | Thome et al. | 395/425 |

OTHER PUBLICATIONS

"IEEE Standard for a Versatile Backplane Bus: VME Bus" IEEE, Sep. 1987, pp. 37–63.

Primary Examiner—Parshutam S. Lall
Assistant Examiner—Viet Vu
Attorney, Agent, or Firm—David Kalbaugh; Melvin J. Sliwka; John L. Forrest, Jr.

[57] ABSTRACT

A slave controller with block transfer capability for transferring data blocks of between one and two hundred fifty six sixteen bit words between a memory and the VERSA MODULE EUROPE bus (VMEbus). The slave controller comprises a programmable array logic device which receives control and address modifier signals from the VMEbus and an address enable signal from a decoding circuit which provides the address enable signal to the programmable array logic device in response to an address strobe signal provided by the VMEbus. The programmable array logic device being responsive to these signals enables the memory for a read or write operation. The programmable array logic device next provides a write pulse to the memory when data is to be written into the memory at addresses provided by a binary counter. When data is to be read from the memory, the programmable array logic device maintains the memory's write enable input at an inactive state and generates an output enable pulse allowing data to be read from the memory at addresses provided by the binary counter. The first address for a block transfer of data is provided by the VMEbus to the counter.

2 Claims, 5 Drawing Sheets

SLAVE CONTROLLER FOR EFFECTING A BLOCK TRANSFER OF SIXTEEN BIT WORDS BETWEEN A MEMORY AND A DATA TRANSFER BUS

BACKGROUND OF THE INVENTION

This application is a continuation-in-part of my co-pending application Ser. No. 07/907,759, filed Jun. 29, 1992.

1. Field of the Invention

The present invention relates generally to digital computer bus architecture and, in particular, to a slave controller having block transfer means for controlling transfer of digital data to and from a slave such as a memory via the VMEbus (VERSA MODULE EUROPE bus).

2. Background of the Invention

The proliferation of microprocessors has produced the economic incentive and consequent trend to construct modular multimicroprocessor computer systems, where implementations use one high performance processor. Such modular systems are facilitated by a bus structure, referred to as a backplane bus, to which microprocessors, system controllers, data storage modules, input/output controllers and associated peripheral devices can be connected and through which each device on the bus can communicate with other devices on the bus.

The main purpose of any bus structure is to allow devices connected to the bus structure to transfer data from one device to one or more of the other devices in accordance with a predetermined protocol of communication. A "standard" bus is one for functional, electrical and mechanical requirements for interface circuits and a set of signal lines that constitute the bus are predetermined for all devices connected to the bus. Generally, the signal line groupings on standard backplane buses are partitioned into logical groupings that comprise a data transfer bus having address and data lines; an arbitration bus having control and acquisition lines; and a utility bus which includes power leads and on some buses, clock signals, initialization and failure detection lines.

The VMEbus is one such standard bus which is well known and very popular in automated manufacturing and processing environments. The VMEbus has a 16/32 backplane bus, the aforementioned signal line groupings and a priority interrupt bus which provides the signal lines needed to generate and service interrupts. The VMEbus is set forth in the "VMEbus Specification Manual", Revision C.1, dated October 1985, published by Motorola.

In the past connecting a device such as a memory board to the VMEbus generally required the user to purchase a board or multiple boards which provide the necessary backplane interface logic and functional logic to allow the device to interface with the VMEbus. These boards are often expensive, complex in design and generally are limited to a single function, such as, allowing a data storage device having a predetermined storage capacity to interface with the VMEbus.

With these and other disadvantages known to backplane interface and functional logic boards for use with the VMEbus the present invention was conceived and one of its objectives is to provide a simple and inexpensive slave controller with block transfer means which will allow a device such as a memory to interface with the VMEbus.

It is another object of the present invention to provide a single chip controller to replace the backplane interface logic and the functional logic currently used to interface a device such as a memory with the VMEbus.

It is yet another object of the present invention to provide a single chip controller with a binary counter for providing addressing so as to allow data to be transferred to or from the memory via the VMEbus in a block of 1 to 256 bytes.

Various other advantages and objectives of the present invention will become apparent to those skilled in the art as a more detailed description of the present invention is set forth below.

SUMMARY OF THE INVENTION

The aforesaid and other objectives of the present invention are accomplished by a slave controller with block transfer means which provides the control signals for effecting the read and write operation of a memory electrically connected to the VMEbus. The slave controller with block transfer means, in turn, provides for the transfer of one to two hundred fifty six bytes of data to or from the memory via the VMEbus.

The slave controller comprises a programmable array logic device which receives control and address modifier signals from the data transfer bus within the VMEbus and an address enable signal from a decoding circuit. The decoding circuit, in turn, provides the address enable signal to the programmable array logic device in response to an address strobe signal supplied to the decoding circuit by the data transfer bus.

The programmable array logic device being responsive to the control, address modifier and address enable signals enables the memory for a read or write operation. The programmable array logic device next provides a write pulse to the memory when data is to be written into the memory at an address provided by block transfer means comprising three synchronous binary counters. When data is to be read from the memory, the programmable array logic device maintains the memory's write enable input at an inactive state and generates an output enable pulse allowing data to be read from the memory at an address provided by the block transfer means. The first address for a block transfer of data is provided to the VMEbus with the remaining addresses of a block transfer being provided by the block transfer means.

Directional control of data between the memory and the VMEbus for the read and write operations is provided by a pair of transceivers.

DETAILED DESCRIPTION OF THE PREFERRED EMBODIMENT

Figure 1:
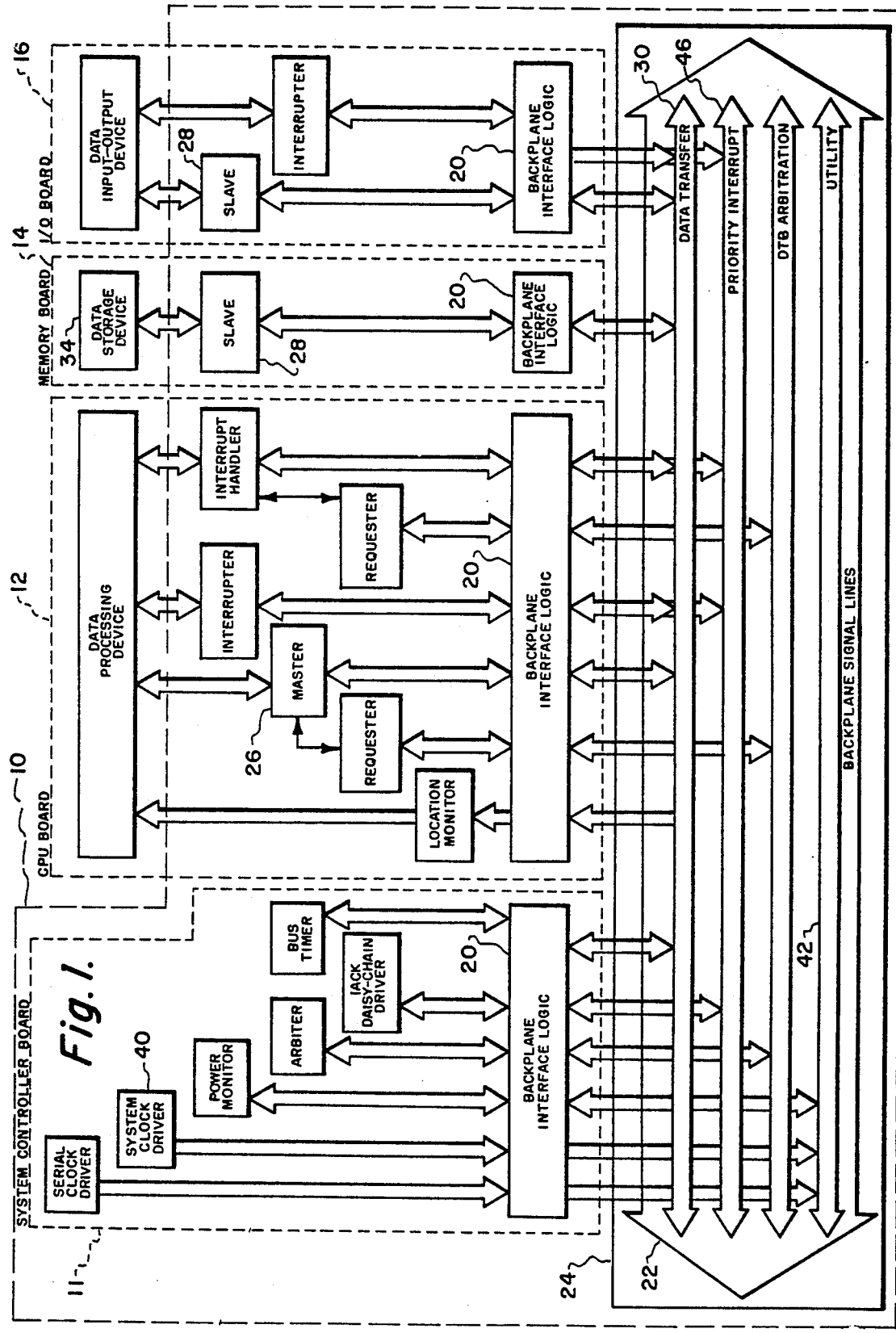
FIG. 1 is a simplified block diagram illustrating the VMEbus structure.

Referring to FIG. 1, there is shown the VMEbus structure, designated by the reference numeral 10, which allows devices connected to the bus structure 10, such as system controller board 11, a central processing unit 12, a memory board 14 and an input/output board 16 to transfer data from one device to one or more of the other devices in accordance with the protocol of communication for the VMEbus. Each device requires at least one functional module and a backplane interface logic circuit 20 to interface with the backplane signal lines 22 of the backplane 24. Each backplane interface logic circuit 20 is a logic circuit that allows a device such as memory board 14 to be electrically connected to backplane signal lines 22 by taking into account the characteristics of the backplane 24, such as signal line impedance, propagation time and termination values. Each functional module is an electronic circuit which may be, for example, a master 26 within central processing unit 12 or a slave 28 within memory board 14 or input/output board 16.

The master controller 26 within central processing unit 12 initiates data transfer bus cycles in order to transfer data between central processing unit 12 and a device having a slave controller 28 such as memory board 14. Each slave controller 28 is a functional module that detects data transfer bus cycles initiated by master 26 and when these data transfer bus cycles specify its participation, the designated slave controller 28 transfers data between itself and master 26. The VMEbus standard defines a data transfer bus cycle as the sequence of level transitions on the signal lines of the data transfer bus 30 that result in the transfer of an address or an address and data between master 26 and a designated slave 28. The data transfer bus cycle is divided into two portions, an address broadcast and then zero or more data transfers.

The VMEbus standard provides for a read cycle wherein the master 26 broadcast an address and an address modifier followed by the transfer of 1, 2, 3 or 4 bytes of data from slave 28 to master 26 and then an acknowledgement of the transfer from slave 28 to master 26. In a like manner a write cycle begins with master 26 broadcasting an address and an address modifier followed by the transfer of 1, 2, 3 or 4 bytes of data from master 26 to slave 28 and then an acknowledgement of the transfer from slave 28 to master 26.

The VMEbus standard also provides for a block read cycle used to transfer a block of 1 to 256 bytes of data from the slave 28 to master 26 wherein master 26 broadcast only one address and address modifier at the beginning of the cycle. The transfer is accomplished by using a string of 1, 2 or 4 byte data transfers with master 26 not releasing data transfer bus 30 until all data bytes within the block have been transferred from slave 28 to master 26. Subsequent to the first address, slave 28 provides addressing for each 1, 2 or 4 byte data transfer until the transfer is complete. The block write transfer for the VMEbus standard is accomplished in an identical manner except that data is transferred from master 26 to slave 28.

Figure 2:
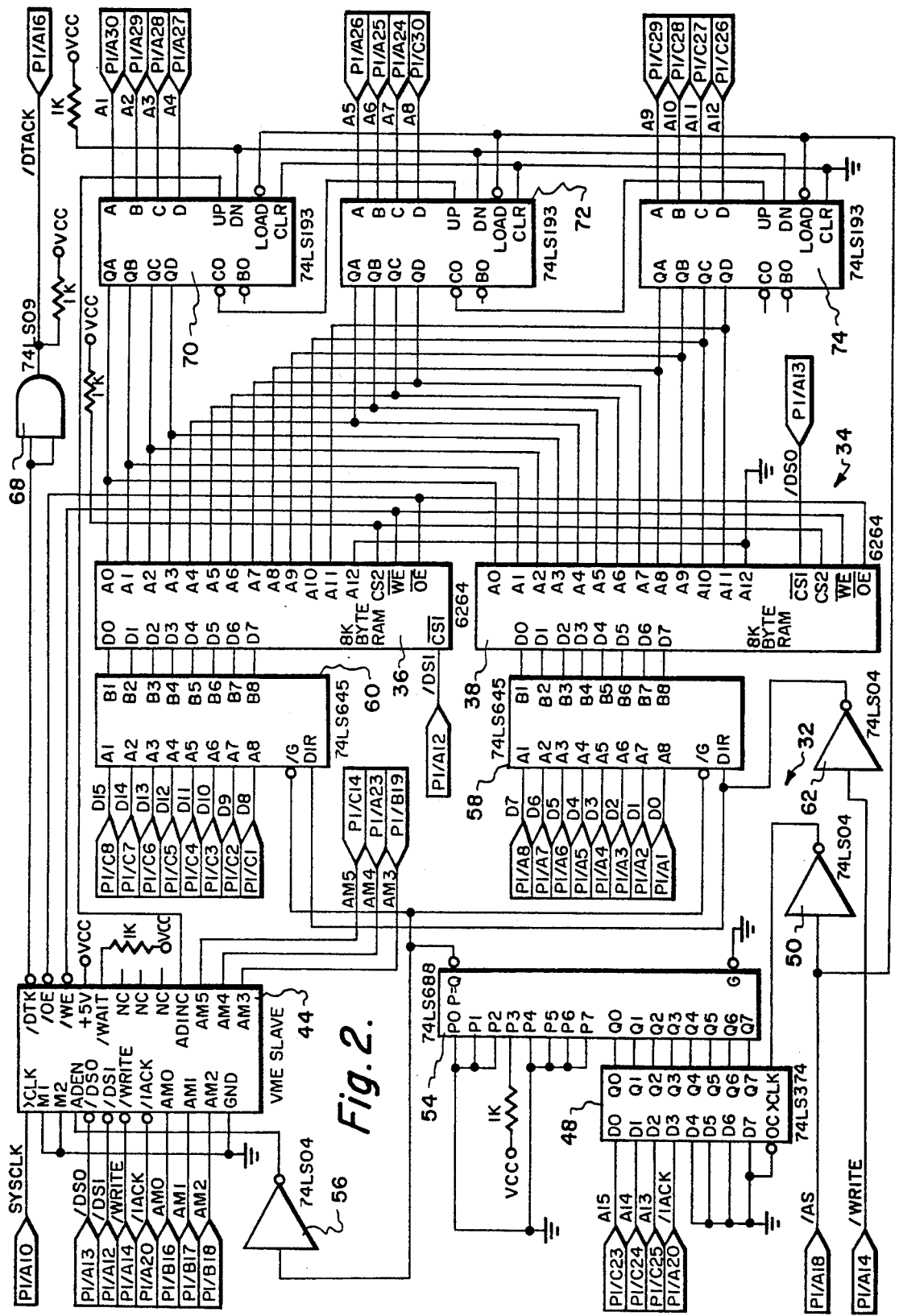
FIG. 2 is a detailed electrical schematic of the slave controller with block transfer means constituting the present invention.

Referring to FIGS. 1 and 2, there is shown a slave controller, designated generally by the reference numeral 32, which detects data transfer byte signals provided by master 26 and thereby effects the transfer of data in blocks of 1 to 256 bytes between central processing unit 12 and a data storage device 34, FIG. 1, comprising of a pair of random access memories (RAMS) 36 and 38. Each RAM 36 and 38, in turn, has storage capabilities of 8192 eight bit words thereby providing for data storage device 34 a total storage capability of 16,384 eight bit words or 8192 sixteen bit words when configured as shown in FIG. 2. Slave controller 32, in turn, is designed to be compatible with the VMEbus specification and performs the functions of the backplane interface logic circuit 20 and slave 28 of memory board 14.

A system clock driver 40 within system controller board 11 provides a sixteen megahertz clock signal, FIG. 3(A), to utility bus 42 which then supplies the clock signal to the CLK input of a programmable array logic device 44. The M1 and M2 inputs of programmable array logic device 44 are connected to ground which indicates to programmable array logic device 44 that address lines A01-A15 on data transfer bus 30 are being utilized to address memory board 14. Similarly, a logic zero supplied to the M1 input and a logic one is supplied to the M2 input of device 44 indicates that address lines A01-A23 on data transfer bus 30 are being used for addressing, while a logic one supplied to the M1 input and a logic zero supplied to the M2 input of device 44 indicates that address lines A01-A31 on data transfer bus 30 are being used for addressing a memory device or the like connected to VMEbus 10. When both the M1 and M2 inputs of programmable array logic device 44 are tied to a logic one programmable array logic device 44 will reset.

When the interrupt acknowledge line (/IACK) on the priority interrupt bus 46 is at the logic one state indicating that an interrupt is not being processed by VMEbus 10, a logic one is supplied to the D3 input of eight bit latch 48. Simultaneously, the A13 through A15 inputs of latch 48 are provided with logic zeros. When the address strobe line (/AS) of data transfer bus 30, FIG. 3(D), transitions from the logic one to the logic zero state indicating the presence of a valid address on data transfer bus 30, the output of inverter 50 will transition from a logic zero to a logic one state thereby clocking the logic signals at the D0-D7 inputs of latch 48 to the Q0-Q7 inputs of an eight bit magnitude comparator 54. Comparator 54, in turn, compares its Q0-Q7 inputs with its P0-P7 inputs and provides a logic zero at its output whenever its inputs are equal, that is whenever an interrupt is not being processed by the VMEbus.

The logic zero signal at the output of comparator 54 is supplied to the input of an inverter 56 which inverts the signal and then provides a logic one, FIG. 3(E), to the address enable input (ADEN) of programmable array logic device 44. The logic zero signal at the output of comparator 54 is supplied to the enable inputs (/G) of a pair of transceivers 58 and 60 thereby enabling transceivers 58 and 60 so as to allow the transfer of eight or sixteen bit data words between VMEbus 10 and RAMS 36 and 38 in blocks of 1 to 256 data bytes.

Figure 3:
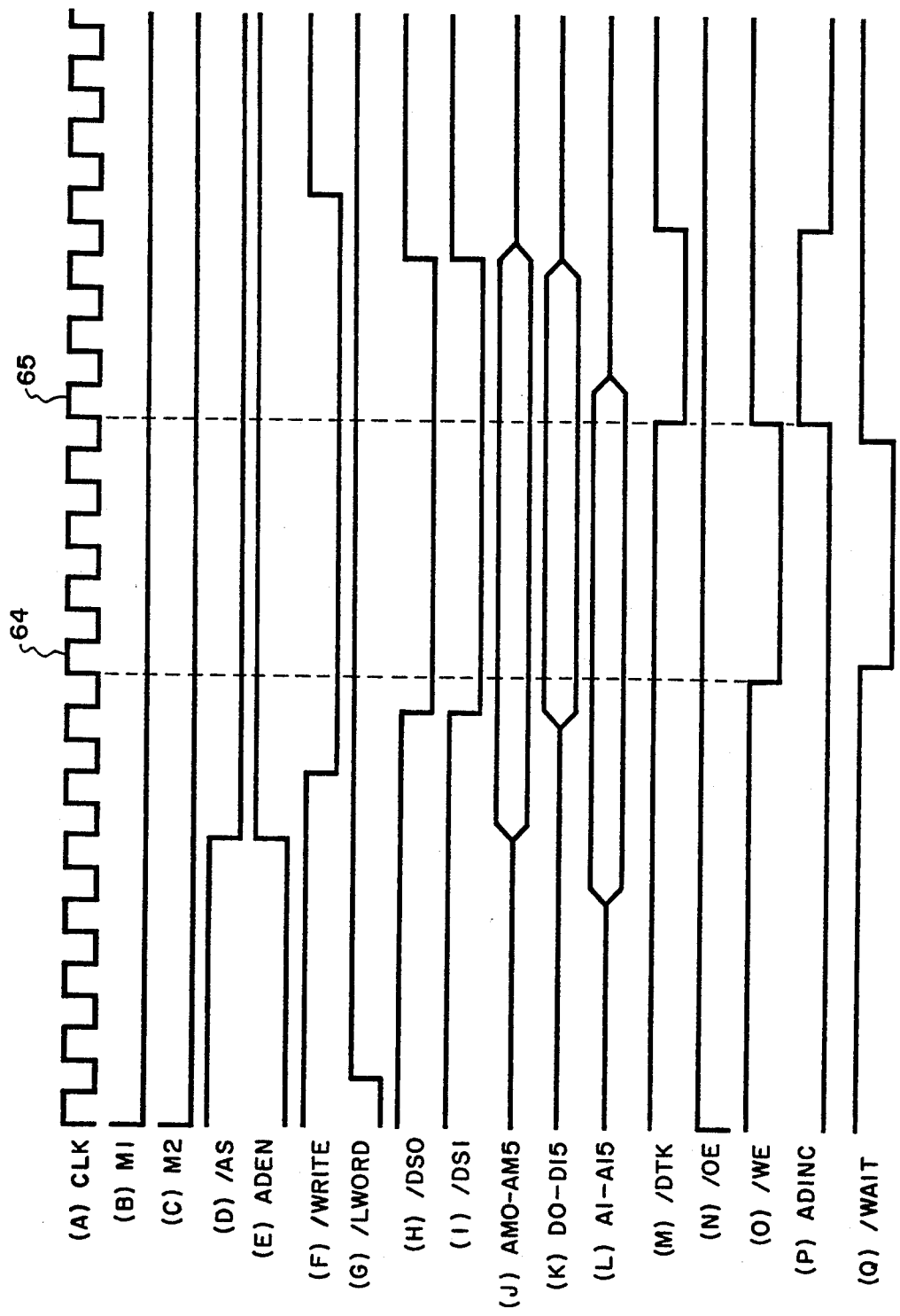
FIG. 3 illustrates a write cycle timing diagram for certain VMEbus signals occurring during a block transfer to the memory of FIG. 2.
Figure 4:
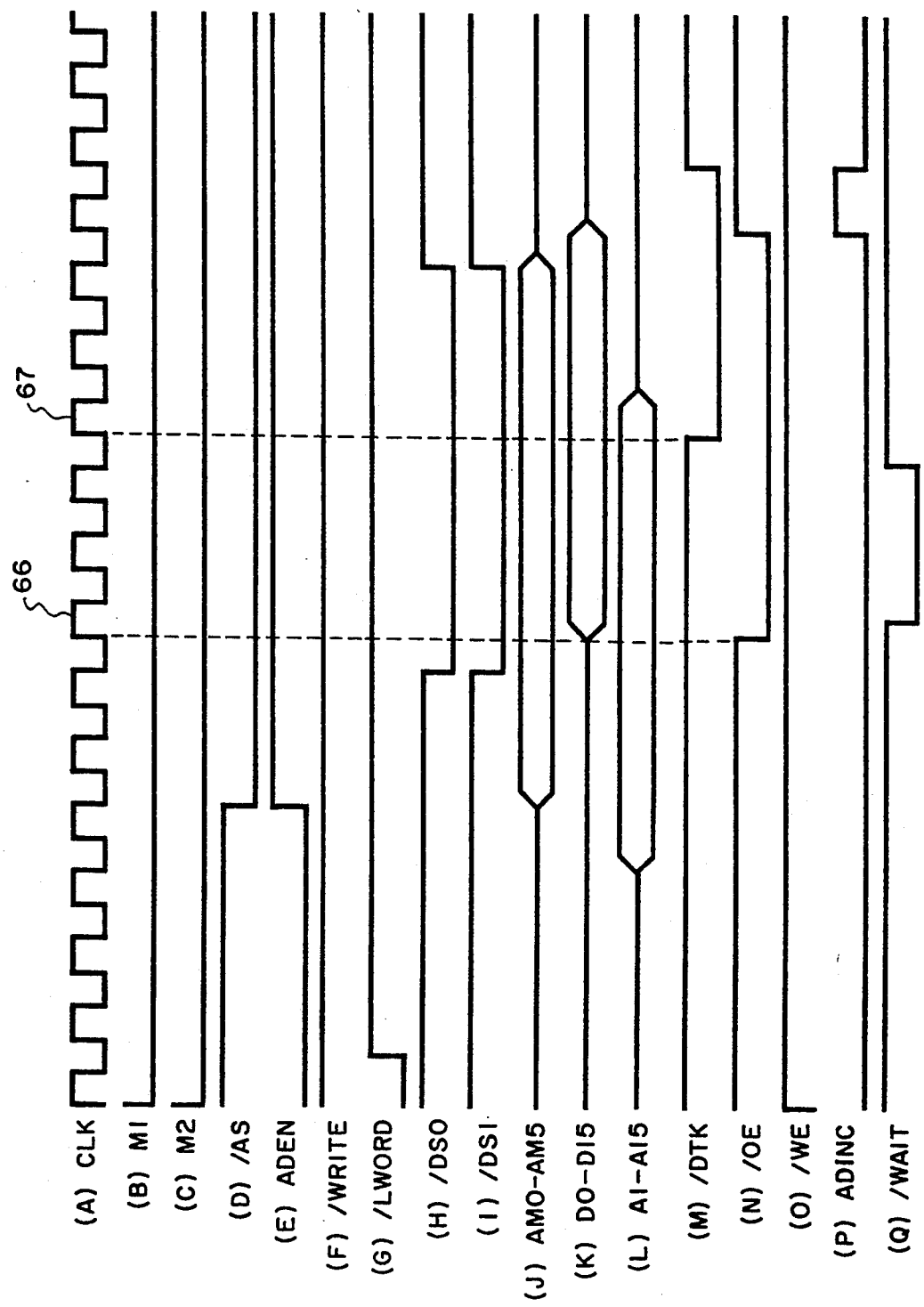
FIG. 4 illustrates a read cycle timing diagram for certain VMEbus signals occurring during a block transfer from the memory of FIG. 2.

During a block write cycle, FIG. 3, or a block read cycle, FIG. 4 a data transfer bus cycle is used to transfer 1 to 256 data bytes between master 26 and memory 34 with programmable array logic device 44 providing the control signals to effect the storage of data within RAMS 36 and 38 or retrieval of data from RAMS 36 and 38. The VMEbus also provides for four categories of byte locations with the two least significant bits of an address defining the byte category as set forth in the following table.

TABLE I

| Category | Byte Address |
|---|---|
| BYTE(0) | XXXXX ... XXXXXXX00 |
| BYTE(1) | XXXXX ... XXXXXXX01 |
| BYTE(2) | XXXXX ... XXXXXXX10 |
| BYTE(3) | XXXXX ... XXXXXXX11 |

The VMEbus specification further provides that some or all of the bytes in a four byte group can be accessed simultaneously by a single data transfer bus cycle. Master 26 uses the address lines A02-A31 on the data transfer bus 30 to select which four byte group will be accessed. Four additional lines on the data transfer bus 30, /DS1, /DS0, A01 and /LWORD are then used to select which byte locations within the four byte group are accessed during a data transfer. The /DS0 and /DS1 are used to select which bytes of Table I are to be transferred while the leading edge of the /DS0 and /DS1 signals of FIGS. 3 and 4 are used as timing signals to coordinate the transfer of data between memory 34 and master 26. During a write cycle the falling edge of the first data strobe, /DS0, FIG. 3(H), or /DS1, FIG. 3(I), indicates that valid data is available on data transfer bus 30. In a like manner, during a read cycle the rising edge of the first data strobe, /DS0, FIG. 4(H) or /DS1, FIG. 4(I), indicates that valid data is available on data transfer bus 30 and is accepted thereby allowing the data to be removed from data transfer bus 30. During address only cycles, data strobes zero and one are both maintained at the logic one state.

For the block write cycle illustrated by FIG. 3, a twelve bit address, FIG. 3(L), is provided from master 26 via data transfer bus address lines A1-A12 to a block transfer means 69 comprising three binary up counters 70, 72 and 74. The twelve bit address is loaded into counters 70, 72 and 74 when the address strobe signal, FIG. 3(D), goes to the logic zero state causing a logic zero to be provided to the load inputs of counters 70, 72 and 74. This results in the address of FIG. 3(L) being supplied to the A0-A11 inputs of RAMS 36 and 38.

When the /write line on data transfer bus 30 goes to the logic zero state, FIG. 3(F), the output of an inverter 62 transition to the logic one state thereby providing a logic one to the DIR inputs of transceivers 58 and 60. This results in eight bit data bytes supplied to the A1-A8 inputs/outputs of transceiver 58 by data transfer bus 30 being passed therethrough to its B1-B8 inputs/outputs and then to the D0-D7 inputs/outputs of RAM 38. Likewise, eight bit data bytes supplied to the A1-A8 inputs/outputs of transceiver 60 by data transfer bus 30 are passed through transceiver 60 to its B1-B8 inputs/outputs and then to the D0-D7 inputs/outputs of RAM 36. The /WRITE line is also connected to the /WRITE input of programmable array logic device 44 such that when the /WRITE signal, FIG. 3(F), transitions to the logic zero state and the /CS1 and the /OE inputs of RAMS 36 and 38 are respectively at the logic zero state and the logic one state, a subsequent clock pulse 64 of the clock signal of FIG. 3(A) will result in the /WE (write enable) output of programmable array logic device 44 transitioning from the logic one to the logic zero state as illustrated by FIG. 3(O). This, in turn, results in the data bits at the D0-D7 inputs of RAMS 36 and 38 being stored in RAMS 36 and 38 at the address supplied to the A0-A11 inputs of each RAM 36 and 38 by counters 70, 72 and 74. When the leading edge of clock pulse 65 transitions from the logic zero state to the logic one state, the /DTK output of programmable array logic device 44 transitions from a logic one to a logic zero, FIG. 3(M), indicating that data has been accepted by memory 34.

The rising edge of the address increment (ADINC) signal, FIG. 3(P), increments counters 70, 72 and 74 by a count of one thereby providing the next sequential address to RAMS 34 and 38. Programmable array logic device 44 continues to increment counters 70, 72 and 74 until the block transfer is complete.

It should also be noted that RAMS 36 and 38 are Hitachi IC memories HM6264LP 8192 word×8-bit High Speed CMOS RAMS having access times in the order of sixty nanoseconds. A RAM with a slow access time of several hundred nanoseconds, that is the RAM requires a write pulse, FIG. 3(O), of several hundred nanoseconds, may also be used with slave controller 32 for data storage by setting the /WAIT output of programmable array logic device 44 to the logic zero state as is best illustrated by FIG. 3(Q). It should be noted that the wait signal of FIG. 3(Q) should not be set to the logic zero state until the /WE signal of FIG. 3(O) is at the logic zero state.

It should also be noted that after program array logic device 44 drives the /DTK signal of FIG. 3(M) the logic one state, master 26 can provide a new address to counters 70, 72 and 74 assuming that the block transfer is complete.

Referring to FIG. 4, the block read cycle for a 1 to 256 byte data transfer from RAMS 36 and 38 to master 26 is similar to the write cycle of FIG. 3 except that the /write line remains at the logic one state during the data transfer. This results in a logic zero being supplied to the DIR inputs of transceivers 58 and 60 allowing data to be transferred through transceivers 58 and 60 to data transfer bus 30. The first clock pulse 66 supplied to the CLK input of programmable array logic device 44 after the /DS0 and /DS1 lines transition to the logic zero states results in the /OE output of device 44 transitioning to the logic zero state. This, in turn, enables RAMS 36 and 38 allowing data stored at the address provided to RAMS 36 and 38 by counters 70, 72 and 74 to be read from RAMS 36 and 38 and then transferred through transceivers 58 and 60 to data transfer bus 30. When the leading edge of clock pulse 67 transitions from the logic zero state to the logic one state, the DTK output, FIG. 4(M), transitions from a logic one to a logic zero. The logic zero is then supplied through AND gate 68 to /DTACK line of data transfer bus 30, so as to indicate that valid data is available on the data transfer bus 30. The logic zero to logic one transition of the /DTACK line indicates that programmable array logic device 44 has released data transfer bus 30.

The rising edge of the address increment (ADINC) signal, FIG. 4(P), increments counters 70, 72 and 74 by a count of one thereby providing the next sequential address to RAMS 34 and 38. Programmable array logic device 44 continues to increment counters 70, 72 and 74 until the block transfer is complete.

A RAM which requires several hundred nanoseconds to have information retrieved therefrom may be used with slave controller 32 by setting the /WAIT output of programmable array logic device 44 to the logic zero state as is best illustrated by FIG. 4(Q). It should be noted that the /WAIT signal of FIG. 4(Q) should not be set to the logic zero state until the /OE signal of FIG. 3(N) is at the logic zero state.

It should further be noted that when the /DS0 and the /DS1 lines of data transfer bus 30 are both at the logic zero state, the VMEbus specification defines the data transfer mode as a double byte transfer, that is sixteen bits of data are transferred via data bus 30 to or from RAMS 36 and 38 for each address provided to RAMS 36 and 38 by counters 72, 74 and 76. As set forth in the VMEbus specification, during a double byte block transfer, data is transferred 16 bits at a time over data lines D0–D15. An example of a double byte block transfer is set forth below.

TABLE II

| Data Transfer | D8–D15 | D0–D7 |
|---|---|---|
| First Data Transfer | BYTE(2) | BYTE(3) |
| ↓ | BYTE(0) | BYTE(1) |
| ↓ | BYTE(2) | BYTE(3) |
| ↓ | BYTE(0) | BYTE(1) |
| ↓ | BYTE(2) | BYTE(3) |
| Last Data Transfer | BYTE(0) | BYTE(1) |

There are six address modifier lines, AM0–AM5, on the data transfer bus which allow master 26 to pass additional binary information to the programmable array logic device 44 during data transfers. In accordance with the VMEbus specification, short addressing AM codes (hexadecimal 29 and 2D) indicate that address lines A02–A15 are being used to select a byte(0–3) group; standard addressing AM codes (hexadecimal 39–3B and 3D–3F) indicate that address lines A02–A24 are being used to select a byte(0–3) group and extended addressing AM codes (hexadecimal 09–0B and 0D–0F) indicate that address lines A02–A31 are being used to select a byte(0–3) group. Since address lines A02–A15 are being used to provide address information to RAMS 36 and 38, short addressing codes, hexadecimal 29 and 2D, will be provided to the AM0–AM5 inputs of programmable array logic device 44. In particular, short supervisory access is defined by the hexadecimal code 2D and short non-privileged access is defined by the hexadecimal code 29.

At this time it should be noted that programmable array logic device 44 is a model GAL22V10 Lattice Semiconductor Corporation Programmable AND-array which is described in U.S. Pat. Nos. 4,761,768 and 4,766,569. It should also be noted that transceivers 50 and 60 are National Semiconductor DM74LS645 Octal Bus Transceivers, comparator 54 is a Goldstar Technology GD74LS688 8 bit magnitude comparator and latch 48 is a National Semiconductor DM74LS374 octal D type transparent latch.

Figure 5:
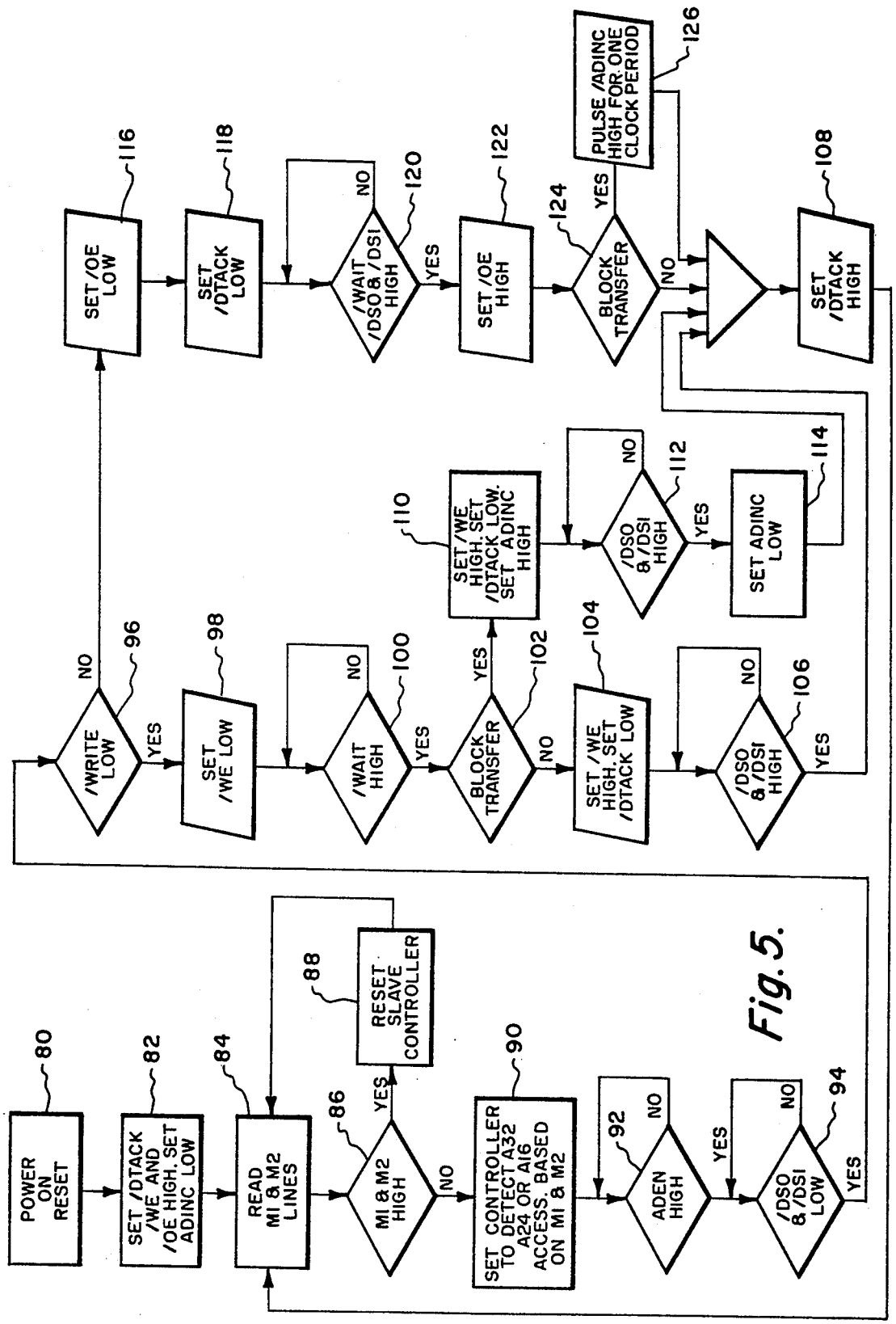
FIG. 5 is a flow chart of the software for the programmable array logic device of FIG. 2.

Referring to FIG. 5, there is shown a flow chart comprising program steps 80–126 for the software used by programmable array logic device 44 to effect the transfer of data between data transfer bus 30 and memory 34 and to read data into and retrieve data from memory 34. The program listing for this software is set forth in Appendix A.

Referring to FIGS. 1–5, power is provided to programmable array logic device 44 and device 44 is reset. During program step 82 the /DTK, /WE and /OE lines of device 44 are set at the logic one state, while ADINC (address increment) output of device 44 is set low. During program step 84, programmable array logic device 44 reads its M1 and M2 inputs and if the M1 and M2 lines are not high (program step 86) device 44 proceeds to program step 90 where device 44 is set to detect the type of address modifier A16 (address lines A01–A15), A24 (address lines A01–A23) or A32 (address lines A01–A31) being used by the VMEbus for addressing memory 34.

Programmable array logic device 44 next samples the ADEN input (program step 92) to determine when it is at the logic one state and then proceeds to program step 94 to determine if the DS0 and DS1 lines have transitioned to the logic zero state before proceeding to program step 96 to determine whether there is a read or write cycle being processed. When a write cycle is being processed, the /WE output is set to the logic zero state (program step 98). Programmable array logic device 44 then proceeds to program step 100.

During program step 100, programmable array logic device 44 determines whether or not the /WAIT signal of FIG. 3(Q) is at the logic one state before proceeding to program step 102. It should be noted that RAMS 36 and 38 require write pulses having pulse widths of approximately 60 nanoseconds, thus the /wait output of programmable array logic device is not utilized and logic ones are supplied to the CS2 inputs of RAMS 36 and 38.

Program step 102 determines whether a block transfer is to be processed. Since data is being transferred to RAMS 36 and 38 in a block of 1 to 256 bytes, programmable array logic device 44 sets its /WE output, FIG. 3(O), to the logic zero state allowing the sixteen bits on data lines D0–D15 to be stored in RAMS 36 and 38 (program step 110). Device 44 then sets the /DTACK line, FIG. 3(M), to the logic zero state, thereby indicating to master 26 that data has been accepted from data transfer bus 30. During program step 110, the ADINC output, FIG. 3(P), of device is set to the logic one state incrementing counters 70, 72 and 74 by a count of one so as to provide to RAMS 36 and 38 the next address for storage of data in RAMS 36 and 38. Programmable array logic device 44 next samples its DS0 and DS1 inputs to determine when the DS0 and DS1 inputs are at the logic one state (program step 112) and then proceeds to program step 108. During program step 108, programmable array logic device 44 sets its /DTK output to the logic one state. Programmable array logic device 44 then writes the succeeding two data bytes into RAMS 36 and 38 as is best illustrated by Table II. The process of writing data into memory 34 continues until every data byte of the block transfer is stored in RAMS 36 and 38.

Program steps 116 through 126 illustrate the operation of programmable array logic device 44 during the block read cycle of FIG. 4. When the /write line, FIG. 4(F) is at the logic one state, a block read cycle is being utilized to transfer a block of 1 to 256 bytes of data from memory 34 to master 26. The /OE output of programmable array logic device is set to the logic zero state, FIG. 4(N), allowing data stored at the address provided by counters 70, 72 and 74 to memory 34 to be read from memory 34 to master 26 via data transfer bus 30. Programmable array logic device 44 then sets the /DTACK line, FIG. 3(M), to the logic zero state, thereby indicating to master 26 that valid data is available on data transfer bus 30 (program step 118). Programmable array logic device 44 next samples its /wait, /DS0 and /DS1 inputs to determine whether these inputs are at the logic one state. When the /wait, /DS0 and /DS1 inputs of programmable array logic device 44 are at the logic one state, programmable array logic device 44 proceeds to program 122 setting its /OE output to the logic one state.

When a double byte block transfer is being processed by programmable array logic device 44, device 44 proceeds to program step 126 set the ADINC line to the logic one state, FIG. 4(P), incrementing counters 70, 72 and 74 by a count of one. During program step 108, programmable array logic device 44 sets its /DTK output to the logic one state. Programmable array logic device 44 then reads the succeeding two data bytes into RAMS 36 and 38 as is best illustrated by Table II. The process of reading data from memory 34 continues until every data byte of the block transfer is read in RAMS 36 and 38.

From the foregoing description, it may readily be seen that the subject invention comprises a new unique and exceedingly useful slave controller with block transfer means for a memory or the like electrically connected to the VMEbus which constitutes a considerable improvement over the known prior art. Obviously, many modifications and variations of the present invention are possible in light of the above teachings. It is therefore to be understood that within the scope of the appended claims, the invention may be practiced otherwise than as specifically described.

APPENDIX A

```
module SLAVE
title 'Slave contoller for VME interface
Design by Nelson Lau, PMTC'

Vmeslave            device 'P22V10';

SYSCLK              pin 1;
        reset,preset        Node 25,26; "must be set to zero if not used M1                  pin 2;   "USED TO SELECT ADDRESSING MODE
        M2                  pin 3;   "USED TO SELECT ADDRESSING MODE
        ADEN                pin 4;   "USED TO SELECT SLAVE
        DS0                 pin 5;   "INPUT FORM VME
        DS1                 pin 6;   "INPUT PROM VME
        WRITE               pin 7;   "INPUT FROM VME
        IACK                pin 8;   "INPUT FORM VME
        AM0                 pin 9;   "INPUT FROM VME
        AM1                 pin 10;  "INPUT FROM VME
        AM2                 pin 11;  "INPUT FROM VME
        AM3                 pin 13;  "INPUT FROM VME
        AM4                 pin 14;  "INPUT FROM VME
        AM5                 pin 15;  "INPUT FROM VME ADINC               pin 16;  "OUTPUT TO ON BOARD ADDRESS COUNTER
        AMEQ                pin 17;  "NC, internal feedback
        S0                  pin 18;  "NC, internal feedback
        S1                  pin 19;  "NC, internal feedback
        WAIT                pin 20;  "HANDSHAKE LINE
        WE                  pin 21;  "WRITE ENABLE OUTPUT
        OE                  pin 22;  "OUTPUT ENABLE OUTPUT
        DTACK               pin 23;  "OUTPUT TO OPEN COLLECTOR DRIVER C                   = .C.;
        Z                   = .Z.;
        X                   = .X.;

INPUT       = [ADEN,IACK,DS0,DS1,WRITE];
        OUTPUT      = [OE,WE,DTACK,S1,S0];
        AM          = [AM5,AM4,AM3,AM2,AM1,AM0];
        OUTPUTS     = [OE,WE,DTACK,S1,S0,ADINC,AMEQ];

EQUATIONS

"DETECT THE BLOCK TRANSFER MODES AND GENERATE A PULSE
        "ON THE OUTPUT ADINC

ADINC   = S1 & !S0 & (AM == ^h3F) & !M1 & M2
        # S1 & !S0 & (AM == ^h3B) & !M1 & M2
        # S1 & !S0 & (AM == ^hB)  & M1 & !M2
        # S1 & !S0 & (AM == ^hF)  & M1 & !M2;
```

"DETECT SINGLE CYCLE DATA TRANSFER MODES AND GENERATE AMEQ
"WHICH IN TURN IS USED TO ENABLE STATE MACHINE

```
!AMEQ   = !M1 & M2 & (AM == ^h39)
        # !M1 & M2 & (AM == ^h3A)
        # !M1 & M2 & (AM == ^h3D)
        # !M1 & M2 & (AM == ^h3E)
        # !M1 & M2 & (AM == ^h3F)
        # !M1 & M2 & (AM == ^h3B)
        # !M1 & !M2 & (AM == ^h2D)
        # !M1 & !M2 & (AM == ^h29)
        # M1 & !M2 & (AM == ^h9)
        # M1 & !M2 & (AM == ^hA)
        # M1 & !M2 & (AM == ^hD)
        # M1 & !M2 & (AM == ^hE)
        # M1 & !M2 & (AM == ^hF)
        # M1 & !M2 & (AM == ^hB);

reset = 0;
preset = 0;
```

"S1 AND S0 IS THE STATE MACHINE USED TO GENERATE OE, WE, DTACK AND ADINC
"AT THE PROPER TIMES. S1 AND S0 FORM A TWO BIT COUNTER WHICH INCREMENTS
"ONLY WHEN ADEN IS HIGH, AMEQ IS LOW, IACK IS HIGH, WAIT IS HIGH AND
"EITHER DS0 OR DS1 IS LOW. S1 IS THE MSB BIT OF THE COUNTER.
"TO PREVENT GLITCHES, THE STATE MACHINE COUNTS IN THIS ORDER,
"0, 1, 3, 2, 0, 1, 3, 2 ..... ETC.

"WHEN DTACK IS LOW AND EITHER DS0 OR DS1 ARE LOW, S1 AND S0 REMAINS
"AT ITS CURRENT COUNT AND DOES NOT INCREMENT. S1 AND S0 ALSO FREEZES
"AT ITS CURRENT COUNT  :N WAIT IS LOW.

"IF NONE OF THE ABOVE CONDITIONS ARE MET, THE STATE MACHINE WILL RESET
"TO STATE 0 AND MAINTAIN THIS STATE UNTIL ONE OF THE CONDITIONS ABOVE IS
"MET. AT WHICH POINT THE STATE MACHINE WILL START COUNTING AGAIN.

```
S1      := !S1 & S0 & ADEN & !AMEQ & IACK & !DS0 & !DS1 & !WRITE & !(!DTACK & !(DS0 & DS1)
        # !S1 & S0 & ADEN & !AMEQ & IACK & !DS0 & DS1 & !WRITE & !(!DTACK & !(DS0 & DS1)) & WAIT
        # !S1 & S0 & ADEN & !AMEQ & IACK & DS0 & !DS1 & !WRITE & !(!DTACK & !(DS0 & DS1)) & WAIT
        # S1 & S0 & ADEN & !AMEQ & IACK & !DS0 & !DS1 & !WRITE & !(!DTACK & !(DS0 & DS1)) & WAIT
        # S1 & S0 & ADEN & !AMEQ & IACK & !DS0 & DS1 & !WRITE & !(!DTACK & !(DS0 & DS1)) & WAIT
        # S1 & S0 & ADEN & !AMEQ & IACK & DS0 & !DS1 & !WRITE & !(!DTACK & !(DS0 & DS1)) & WAIT
        # !S1 & S0 & ADEN & !AMEQ & IACK & !DS0 & !DS1 & WRITE & !(!DTACK & !(DS0 & DS1)) & WAIT
        # !S1 & S0 & ADEN & !AMEQ & IACK & !DS0 & DS1 & WRITE & !(!DTACK & !(DS0 & DS1)) & WAIT
        # !S1 & S0 & ADEN & !AMEQ & IACK & DS0 & !DS1 & WRITE & !(!DTACK & !(DS0 & DS1)) & WAIT
        # S1 & S0 & ADEN & !AMEQ & IACK & DS0 & DS1 & WRITE & !(!DTACK & !(DS0 & DS1)) & WAIT
        # S1 & !DTACK & !(DS0 & DS1)
        # S1 & !WAIT;

S0      :=!S1 & !S0 & ADEN & !AMEQ & IACK & !DS0 & !DS1 & !WRITE & !(!DTACK & !(DS0 & DS1)) & WAIT
        # !S1 & !S0 & ADEN & !AMEQ & IACK & !DS0 & DS1 & !WRITE & !(!DTACK & !(DS0 & DS1)) & WAIT
        # !S1 & !S0 & ADEN & !AMEQ & IACK & DS0 & !DS1 & !WRITE & !(!DTACK & !(DS0 & DS1)) & WAIT
        # !S1 & S0 & ADEN & !AMEQ & IACK & !DS0 & !DS1 & !WRITE & !(!DTACK & !(DS0 & DS1)) & WAIT
        # !S1 & S0 & ADEN & !AMEQ & IACK & !DS0 & DS1 & !WRITE & !(!DTACK & !(DS0 & DS1)) & WAIT
        # !S1 & S0 & ADEN & !AMEQ & IACK & DS0 & !DS1 & !WRITE & !(!DTACK & !(DS0 & DS1)) & WAIT
        # !S1 & !S0 & ADEN & !AMEQ & IACK & !DS0 & !DS1 & WRITE & !(!DTACK & !(DS0 & DS1)) & WAIT
        # !S1 & !S0 & ADEN & !AMEQ & IACK & !DS0 & DS1 & WRITE & !(!DTACK & !(DS0 & DS1)) & WAIT
        # !S1 & !S0 & ADEN & !AMEQ & IACK & DS0 & !DS1 & WRITE & !(!DTACK & !(DS0 & DS1)) & WAIT
        # !S1 & S0 & ADEN & !AMEQ & IACK & !DS0 & !DS1 & WRITE & !(!DTACK & !(DS0 & DS1)) & WAIT
        # !S1 & S0 & ADEN & !AMEQ & IACK & !DS0 & DS1 & WRITE & !(!DTACK & !(DS0 & DS1)) & WAIT
        # !S1 & S0 & ADEN & !AMEQ & IACK & DS0 & !DS1 & WRITE & !(!DTACK & !(DS0 & DS1)) & WAIT
        # S0 & !DTACK & !(DS0 & DS1)
        # S0 & !WAIT;
```

"OE IS GENERATED WHEN WRITE IS HIGH, ADEN IS HIGH, AMEQ IS LOW, IACK IS HIGH
"EITHER DS0 OR DS1 IS LOW, WAIT IS HIGH AND THE VALUE OF THE STATE MACHINE
"IS EITHER 1 OR 3. OE IS KEPT LOW WHEN WAIT HAS BEEN DETECTED LOW.

```
!OE     := WRITE & !S1 & !S0 & ADEN & !AMEQ & IACK & !DS0 & !DS1 & !(!DTACK & !(DS0 & DS1)) & WAIT
        # WRITE & !S1 & !S0 & ADEN & !AMEQ & IACK & !DS0 & DS1 & !(!DTACK & !(DS0 & DS1)) & WAIT
        # WRITE & !S1 & !S0 & ADEN & !AMEQ & IACK & DS0 & !DS1 & !(!DTACK & !(DS0 & DS1)) & WAIT
```

```
# WRITE & !S1 & S0 & ADEN & !AMEQ & IACK & !DS0 & !DS1 & !(!DTACK & !(DS0 & DS1)) & WAIT
# WRITE & !S1 & S0 & ADEN & !AMEQ & IACK & !DS0 & DS1 & !(!DTACK & !(DS0 & DS1)) & WAIT
# WRITE & !S1 & S0 & ADEN & !AMEQ & IACK & DS0 & !DS1 & !(!DTACK & !(DS0 & DS1)) & WAIT
# !OE & !DTACK & !(DS0 & DS1)
# !OE & !WAIT;
```

"WE IS GENERATED WHEN WRITE IS LOW, ADEN IS HIGH, AMEQ IS LOW, IACK IS HIGH
"EITHER DS0 OR DS1 IS LOW, WAIT IS HIGH AND THE VALUE OF THE STATE MACHINE
"IS 3. WE IS KEPT LOW WHEN WAIT HAS BEEN DETECTED LOW.

!WE      := !WRITE & !S1 & S0 & ADEN & !AMEQ & IACK & !DS0 & !DS1 & WAIT

```
C,1,^hF,1,1,1,0,1,1,0] -> [1,1,1,0,0,0];       "VME RAISED DS LINES!  RELEASE DTACK!

C,0,^h2D,0,1,0,0,1,0,0] -> [1,1,1,0,0,0];      "WAITING FOR VME TO ADDRESS BOARD
C,1,^h2D,1,1,0,0,1,0,0] -> [1,1,1,0,1,0];      "GEN 1 WAIT STATE FOR ADDRESS TO SETTLE
C,0,^h2D,0,1,0,0,1,0,0] -> [1,1,1,0,0,0];      "VME DIED, RESET PAL
C,1,^h2D,1,1,0,0,1,0,0] -> [1,1,1,0,1,0];      "GEN 1 WAIT STATE FOR ADDRESS TO SETTLE
C,1,^h2D,1,1,0,0,0,0,0] -> [1,1,1,0,1,0];      "GEN 1 WAIT STATE FOR ADDRESS TO SETTLE
C,1,^h2D,1,1,0,0,1,0,0] -> [1,0,1,1,1,0];        "STROBE DATA INTO RAM
C,1,^h2D,1,1,0,0,1,0,0] -> [1,1,0,1,0,0];        "DRIVE DTACK LOW
C,1,^h2D,1,1,0,0,1,0,0] -> [1,1,0,1,0,0];         "NO RESPONSE FROM VME!  KEEP DTACK LOW
C,1,^h2D,1,1,0,0,1,0,0] -> [1,1,0,1,0,0];         "NO RESPONSE FROM VME!  KEEP DTACK LOW
C,1,^h2D,1,1,0,0,1,0,0] -> [1,1,0,1,0,0];         "NO RESPONSE FROM VME!  KEEP DTACK LOW
C,1,^h2D,1,1,1,0,1,0,0] -> [1,1,1,0,0,0];      "VME RAISED DS LINES!  RELEASE DTACK!

C,0,^h3F,0,0,0,0,1,0,1] -> [1,1,1,0,0,0];      "WAITING FOR VME TO ADDRESS BOARD
C,1,^h3F,1,0,0,0,1,0,1] -> [1,1,1,0,1,0];      "GEN 1 WAIT STATE FOR ADDRESS TO SETTLE
C,0,^h3F,0,0,0,0,1,0,1] -> [1,1,1,0,0,0];      "VME DIED, RESET PAL
C,1,^h3F,1,0,0,0,1,0,1] -> [1,1,1,0,1,0];      "GEN 1 WAIT STATE FOR ADDRESS TO SETTLE
C,1,^h3F,1,0,0,0,1,0,1] -> [1,0,1,1,1,0];        "STROBE DATA INTO RAM
C,1,^h3F,1,0,0,0,1,0,1] -> [1,1,0,1,0,1];        "DRIVE DTACK LOW
C,1,^h3F,1,0,0,0,1,0,1] -> [1,1,0,1,0,1];        "NO RESPONSE FROM VME!  KEEP DTACK LOW
C,1,^h3F,1,0,0,0,1,0,1] -> [1,1,0,1,0,1];        "NO RESPONSE FROM VME!  KEEP DTACK LOW
C,1,^h3F,1,0,0,0,1,0,1] -> [1,1,0,1,0,1];        "NO RESPONSE FROM VME!  KEEP DTACK LOW
C,1,^h3F,1,1,1,0,1,0,1] -> [1,1,1,0,0,0];      "VME RAISED DS LINES!  RELEASE DTACK!
```

This set of test vectors, tests for a transfer of data from slave to master
Word transfer

```
C,1,^h3F,1,1,1,1,1,0,1] -> [1,1,1,0,0,0];      "WAITING FOR VME TO ADDRESS BOARD
C,1,^h3F,1,0,0,1,1,0,1] -> [0,1,1,0,1,0];      "ENABLE OUTPUTS OF RAM, ADDRESS SHOULD BE STABLE BY NOW
C,1,^h3F,1,0,0,1,0,0,1] -> [0,1,1,0,1,0];      "ENABLE OUTPUTS OF RAM, ADDRESS SHOULD BE STABLE BY NOW
C,1,^h3F,1,0,0,1,1,0,1] -> [0,1,0,1,1,0];        "DRIVE DTACK LOW
C,1,^h3F,1,0,0,1,1,0,1] -> [0,1,0,1,1,0];        "NO RESPONSE FROM VME!  KEEP DTACK LOW
C,1,^h3F,1,1,1,1,1,0,1] -> [1,1,0,1,0,1];      "VME RAISED DS LINES!  REMOVE DATA
C,1,^h3F,1,1,1,1,0,0,1] -> [1,1,0,1,0,1];      "VME RAISED DS LINES!  REMOVE DATA
C,1,^h3F,1,1,1,1,1,0,1] -> [1,1,1,0,0,0];      "RELEASE DTACK!

C,1,^h2D,1,1,1,1,1,0,0] -> [1,1,1,0,0,0];      "WAITING FOR VME TO ADDRESS BOARD
C,1,^h2D,1,0,0,1,1,0,0] -> [0,1,1,0,1,0];      "ENABLE OUTPUTS OF RAM, ADDRESS SHOULD BE STABLE BY NOW
C,1,^h2D,1,0,0,1,1,0,0] -> [0,1,0,1,1,0];        "DRIVE DTACK LOW
C,1,^h2D,1,0,0,1,1,0,0] -> [0,1,0,1,1,0];        "NO RESPONSE FROM VME!  KEEP DTACK LOW
C,1,^h2D,1,0,0,1,1,0,0] -> [0,1,0,1,1,0];        "NO RESPONSE FROM VME!  KEEP DTACK LOW
C,1,^h2D,1,0,0,1,1,0,0] -> [0,1,0,1,1,0];        "NO RESPONSE FROM VME!  KEEP DTACK LOW
C,1,^h2D,1,1,1,1,1,0,0] -> [1,1,0,1,0,0];      "VME RAISED DS LINES!  REMOVE DATA
C,1,^h2D,1,1,1,1,1,0,0] -> [1,1,1,0,0,0];      "RELEASE DTACK!
``` test_vectors 'STATE 2'

([SYSCLK,INPUT,AM,WAIT,M1,M2] -> [OE,WE,DTACK,S1,S0])

"Test unused states

```
@CONST I=0; @REPEAT 32 {
[C,@EXPR I;,^h39,1,1,1] -> [1,1,1,0,0];
@CONST I=I+1;}
``` end SLAVE

```
#  !WRITE & !S1 & S0 & ADEN & !AMEQ & IACK & !DS0 & DS1 & WAIT
#  !WRITE & !S1 & S0 & ADEN & !AMEQ & IACK & DS0 & !DS1 & WAIT
#  !WE & !WAIT;
```

"DTACK IS GENERATED WHEN ADEN IS HIGH, AMEQ IS LOW, IACK IS HIGH AND WHEN
"STATE MACHINE IS IN EITHER STATE 3 OR 2, WHEN WRITE IS HIGH. OTHERWISE
"IF WRITE IS LOW, DTACK IS GENERATED WHEN STATE MACHINE IS IN STATE 2.

```
!DTACK  := !WRITE & S1 & S0 & ADEN & !AMEQ & IACK & !DS0 & !DS1 & !(!DTACK & !(DS0 & DS1)) & WAI'
        #  !WRITE & S1 & S0 & ADEN & !AMEQ & IACK & !DS0 & DS1 & !(!DTACK & !(DS0 & DS1)) & WAIT
        #  !WRITE & S1 & S0 & ADEN & !AMEQ & IACK & DS0 & !DS1 & !(!DTACK & !(DS0 & DS1)) & WAIT
        #  WRITE & !S1 & S0 & ADEN & !AMEQ & IACK & !DS0 & !DS1 & !(!DTACK & !(DS0 & DS1)) & WAIT
        #  WRITE & !S1 & S0 & ADEN & !AMEQ & IACK & !DS0 & DS1 & !(!DTACK & !(DS0 & DS1)) & WAIT
        #  WRITE & !S1 & S0 & ADEN & !AMEQ & IACK & DS0 & !DS1 & !(!DTACK & !(DS0 & DS1)) & WAIT
        #  WRITE & S1 & S0 & ADEN & !AMEQ & IACK & DS0 & DS1 & !(!DTACK & !(DS0 & DS1)) & WAIT
        #  !DTACK & !DTACK & !(DS0 & DS1)
        #  !DTACK & !WAIT;
``` age st_vectors 'state 1'
SYSCLK,ADEN,AM,IACK,DS0,DS1,WRITE,WAIT,M1,M2] -> [OE,WE,DTACK,S1,S0,ADINC])

his set of test vectors, tests for a transfer of data from vme to slave

```
,0,^h3F,0,1,0,0,1,0,1] -> [1,1,1,0,0,0];   "WAITING FOR VME TO ADDRESS BOARD
,1,^h3F,1,1,0,0,1,0,1] -> [1,1,1,0,1,0];   "GEN 1 WAIT STATE FOR ADDRESS TO SETTLE
,0,^h3F,0,1,0,0,1,0,1] -> [1,1,1,0,0,0];   "VME DIED, RESET PAL
,1,^h3F,1,1,0,0,1,0,1] -> [1,1,1,0,1,0];   "GEN 1 WAIT STATE FOR ADDRESS TO SETTLE
,1,^h3F,1,1,0,0,1,0,1] -> [1,0,1,1,1,0];    "STROBE DATA INTO RAM
,1,^H3F,1,1,0,0,0,0,1] -> [1,0,1,1,1,0];
,1,^h3F,1,1,0,0,1,0,1] -> [1,1,0,1,0,1];    "DRIVE DTACK LOW
,1,^h3F,1,1,0,0,1,0,1] -> [1,1,0,1,0,1];    "NO RESPONSE FROM VME! KEEP DTACK LOW
,1,^h3F,1,1,0,0,1,0,1] -> [1,1,0,1,0,1];    "NO RESPONSE FROM VME! KEEP DTACK LOW
,1,^h3F,1,1,1,0,1,0,1] -> [1,1,1,0,0,0];   "VME RAISED DS LINES! RELEASE DTACK!

,0,^hF,0,0,0,0,1,1,0] -> [1,1,1,0,0,0];    "WAITING FOR VME TO ADDRESS BOARD
,1,^hF,1,0,0,0,1,1,0] -> [1,1,1,0,1,0];    "GEN 1 WAIT STATE FOR ADDRESS TO SETTLE
,0,^hF,0,0,0,0,1,1,0] -> [1,1,1,0,0,0];    "VME DIED, RESET PAL
,1,^hF,1,0,0,0,1,1,0] -> [1,1,1,0,1,0];    "GEN 1 WAIT STATE FOR ADDRESS TO SETTLE
,1,^hF,1,0,0,0,1,1,0] -> [1,0,1,1,1,0];     "STROBE DATA INTO RAM
,1,^HF,1,0,0,0,0,1,0] -> [1,0,1,1,1,0];
,1,^hF,1,0,0,0,1,1,0] -> [1,1,0,1,0,1];    "DRIVE DTACK LOW
,1,^hF,1,0,0,0,1,1,0] -> [1,1,0,1,0,1];    "NO RESPONSE FROM VME! KEEP DTACK LOW
,1,^hF,1,0,0,0,1,1,0] -> [1,1,0,1,0,1];    "NO RESPONSE FROM VME! KEEP DTACK LOW
```

What is claimed is:

1. A slave controller for connecting a memory to a VMEbus bus, said slave controller receiving a plurality of control signals provided by said VMEbus, said control signals provided by said VMEbus including an address strobe, an interrupt acknowledge, a clock signal, a first write signal, and a first address having a first address bit, a second address bit and a third address bit, said slave controller comprising:

a first inverter having an input and an output, said input of said first inverter being connected to said VMEbus to receive said address strobe from said VMEbus, said first inverter inverting said address strobe providing at said output of said first inverter an inverted address strobe;

a latch having a clock input, four data inputs and four data outputs, said clock input of said latch being connected to said output of said first inverter to receive said inverted address strobe from said first inverter and said four data inputs of said latch being connected to said VMEbus to receive said interrupt acknowledge and said first address bit, said second address bit and said third address bit of said first address from said VMEbus;

said latch, responsive to said inverted address strobe, latching said interrupt acknowledge and said first address bit, said second address bit and said third address bit of said first address to said four data outputs of said latch;

a comparator having first, second, third and fourth comparison inputs, four data inputs and an output, each of said four data inputs of said comparator being connected to one of said four data outputs of said latch to receive from said latch said interrupt acknowledge and said first address bit, said second address bit and said third address bit of said first address;

said first, second and third comparison inputs of said comparator being connected to a ground and said fourth comparison input of said comparator being connected to a voltage source, said first, second, third and fourth comparison inputs of said comparator receiving four predetermined logic signals, said voltage source and said ground providing said four predetermined logic signals;

said comparator comparing said four predetermined logic signals with said interrupt acknowledge and said first address bit, said second address bit and said third address bit of said first address;

said comparator providing a first enable signal whenever said predetermined logic signals are equivalent to said interrupt acknowledge and said first address bit, said second address bit and said third address bit of said first address;

a second inverter having an input and an output, said input of said second inverter being connected to said output of said comparator to receive said first enable signal from said comparator, said second inverter inverting said first enable signal providing at said output of said second inverter an inverted first enable signal;

a third inverter having an input and an output, said input of said third inverter being connected to said VMEbus to receive said first write signal from said VMEbus, said third inverter inverting said first write signal providing at said output of said third inverter an inverted first write signal;

a first transceiver having eight data input/outputs connected to said VMEbus, eight data input/outputs connected to said memory, a direction control input connected to said output of said third inverter to receive said inverted first write signal from said third inverter, an enable input connected to said output of said comparator to receive said first enable signal from said comparator;

a second transceiver having eight data input/outputs connected to said VMEbus, eight data input/outputs connected to said memory, a direction control input connected to said output of said third inverter to receive said inverted first write signal from said third inverter and an enable input connected to said output of said comparator to receive said first enable signal from said comparator;

said first and said second transceivers, responsive to said inverted first write signal, controlling a direction of movement of a plurality of sixteen bit data words between said VMEbus and said memory, each of said sixteen bit data words passing through said first and second transceivers, said direction of movement of each of said sixteen bit data words being from said VMEbus through said first and second transceivers to said memory when said inverted first write signal is active and said direction of movement of each of said sixteen bit data words being from said memory through said first and second transceivers to said VMEbus when said inverted first write signal is inactive, said first enable signal enabling said first transceiver and said second transceiver;

a programmed array logic device having an enable input connected to said output of said second inverter to receive said inverted first enable signal from said second inverter, a clock input to said VMEbus to receive said clock signal from said VMEbus, a write input connected to said VMEbus to receive said first write signal from said VMEbus and an interrupt acknowledge input connected to said VMEbus to receive said interrupt acknowledge from said VMEbus;

said programmed array logic device, responsive to said first write signal, said inverted first enable signal, said interrupt acknowledge and said clock signal generating a second write signal, a data acknowledge signal and a second enable signal;

said programmed array logic device having an enable output connected to said memory to provide said second enable signal to said memory enabling said memory, a write output connected to said memory to provide said second write signal to said memory effecting a storage of said plurality of sixteen bit data words in said memory when said second write signal is active and a retrieval of said plurality of sixteen bit data words from said memory when said second write signal is inactive and an acknowledge output connected to said VMEbus to provide said data acknowledge signal to said VMEbus;

an AND gate having a pair of inputs connected to said acknowledge output of said programmable array logic device and an output connected to said VMEbus, said output of said AND gate providing said data acknowledge signal to said VMEbus; and a synchronous up counter having a load input for receiving said address strobe, a plurality of address inputs for receiving said address bits of said first address, an up input connected to said address increment output of said programmable array logic device for receiving said plurality of address increment signals and a plurality of address outputs electrically connected to said memory so as to provide said first address and successive addresses to said memory and thereby effect a block transfer of said plurality of sixteen bit data words between said VMEbus and said memory.

2. The slave controller of claim 1 wherein said binary number occurring at said eight data inputs of said comparator is representative of logic levels for said interrupt acknowledge and a first address bit, a second address bit and a third address bit of said first address.

* * * * *